United States Patent
Dunham et al.

(10) Patent No.: US 10,324,727 B2
(45) Date of Patent: Jun. 18, 2019

(54) MEMORY DEPENDENCE PREDICTION

(71) Applicant: ARM LIMITED, Cambridge (GB)

(72) Inventors: Curtis Glenn Dunham, Austin, TX (US); Mitchell Bryan Hayenga, Austin, TX (US)

(73) Assignee: ARM Limited, Cambridge (GB)

( * ) Notice: Subject to any disclaimer, the term of this patent is extended or adjusted under 35 U.S.C. 154(b) by 271 days.

(21) Appl. No.: 15/238,778

(22) Filed: Aug. 17, 2016

(65) Prior Publication Data

US 2018/0052691 A1 Feb. 22, 2018

(51) Int. Cl.
*G06F 9/38* (2018.01)
*G06F 9/30* (2018.01)

(52) U.S. Cl.
CPC .......... *G06F 9/3844* (2013.01); *G06F 9/3004* (2013.01); *G06F 9/30145* (2013.01); *G06F 9/30181* (2013.01); *G06F 9/3836* (2013.01); *G06F 9/3855* (2013.01)

(58) Field of Classification Search
CPC .... G06F 9/3836; G06F 9/3844; G06F 9/3004; G06F 9/30043; G06F 9/30189; G06F 9/3834
USPC ................................................. 712/716, 239
See application file for complete search history.

(56) References Cited

U.S. PATENT DOCUMENTS

| | | | | |
|---|---|---|---|---|
| 6,661,358 B1* | 12/2003 | Hashimoto | ............. | H03M 7/40 341/65 |
| 2002/0178349 A1 | 11/2002 | Shibayama et al. | | |
| 2004/0199752 A1* | 10/2004 | Winberg | ............. | G06F 9/383 712/225 |
| 2009/0172360 A1 | 7/2009 | Hikichi | | |
| 2010/0325395 A1* | 12/2010 | Burger | ............. | G06F 9/3834 712/216 |
| 2013/0007423 A1* | 1/2013 | Burcea | ............. | G06F 9/3836 712/239 |
| 2015/0127928 A1* | 5/2015 | Burger | ............. | G06F 9/3836 712/229 |
| 2015/0324203 A1* | 11/2015 | Ashcraft | ............. | G06F 12/0862 711/125 |

(Continued)

FOREIGN PATENT DOCUMENTS

JP 2000-322257 11/2000

OTHER PUBLICATIONS

International Search Report and Written Opinion of the International Searching Authority dated Sep. 25, 2017 in PCT/GB2017/051836, 10 pages.

*Primary Examiner* — Aimee Li
*Assistant Examiner* — Courtney P Carmichael-Moody
(74) *Attorney, Agent, or Firm* — Nixon & Vanderhye P.C.

(57) ABSTRACT

A data processing apparatus executes a stream of instructions. Memory access circuitry accesses a memory in response to control signals associated with a memory access instruction that is executed in the stream of instructions. Branch prediction circuitry predicts the outcome of branch instructions in the stream of instructions based on a branch prediction table. Processing circuitry performs a determination of whether out-of-order execution of memory access instructions is to be performed based on memory prediction data, and selectively enables out-of-order execution of the memory access instructions in dependence on the determination. The memory prediction data is stored in the branch prediction table.

14 Claims, 4 Drawing Sheets

| 210 | 230 | 260 |
|---|---|---|
| Predictor data | Tag | Extra |
| 01 | 01000001 10101000 10111101 | 2 |
| | | |

250

(56) References Cited

U.S. PATENT DOCUMENTS

| | | | |
|---|---|---|---|
| 2016/0092221 A1* | 3/2016 | Stempel | G06F 9/30072 |
| | | | 712/239 |
| 2017/0010970 A1* | 1/2017 | Chou | G06F 12/0862 |
| 2017/0046167 A1* | 2/2017 | Yen | G06F 9/3869 |
| 2017/0083327 A1* | 3/2017 | Burger | G06F 9/3004 |

* cited by examiner

| Predictor data | Tag | Extra |
|---|---|---|
| 01 | 01000001 10101000 10111101 | 2 |
| | | |
| | | |

FIG. 3

MEMORY DEPENDENCE PREDICTION

TECHNICAL FIELD

The present disclosure relates to data processing for an apparatus having a memory.

DESCRIPTION

A data processing apparatus can be used to execute a stream of instructions. A number of instructions make use of one or more resources within the data processing apparatus. For example, one instruction might access a memory, whilst another instruction could perform logic or arithmetic using an Arithmetic Logic Unit (ALU). Sometimes, the use of these resources spans a number of clock cycles. Accordingly, it is sometimes desirable to re-order the instructions to use one resource whilst another resource is being used. One problem that arises during such re-ordering is with instructions that load and store data values in memory. Sometimes, such instructions are dependent on one another. For example, one instruction might load a value from memory that has been stored by another instruction. In these cases, it is necessary to ensure that the relationship between the instructions is maintained, despite the re-ordering, in order to avoid a memory ordering violation from occurring. In some cases, it might be necessary to disable out-of-order execution of instructions in order to inhibit memory ordering violations from occurring. However, it is desirable to do so sparingly, since this can impact the performance of the underlying data processing apparatus.

SUMMARY

Viewed from a first example configuration, there is provided a data processing apparatus to execute a stream of instructions, the data processing apparatus comprising: memory access circuitry to access a memory in response to control signals associated with a memory access instruction that is executed in said stream of instructions; branch prediction circuitry to predict the outcome of a branch instructions in said stream of instructions based on a branch prediction table; and processing circuitry to perform a determination of whether out-of-order execution of memory access instructions is to be performed based on memory prediction data, and to selectively enable out-of-order execution of said memory access instructions in dependence on said determination, wherein said memory prediction data is stored in said branch prediction table.

Viewed from a second example configuration, there is provided a data processing method to execute a stream of instructions in a data processing apparatus comprising a branch predictor to predict the outcome of branch instructions in said stream of instructions based on a branch prediction table, the data method comprising: performing a determination of whether out-of-order execution of memory access instructions is to be performed based on memory prediction data; and selectively enabling out-of-order execution of memory access instructions in dependence on said determination, wherein said memory prediction data is stored in said branch prediction table.

Viewed from a third example configuration, there is provided a data processing method to execute a stream of instructions in a data processing apparatus comprising a branch predictor to predict the outcome of branch instructions in said stream of instructions based on a branch prediction table, the data method comprising: means for performing a determination of whether out-of-order execution of memory access instructions is to be performed based on memory prediction data; and means for selectively enabling out-of-order execution of said memory access instructions in dependence on said determination, wherein said memory prediction data is stored in said branch prediction table.

BRIEF DESCRIPTION OF THE DRAWINGS

The present invention will be described further, by way of example only, with reference to embodiments thereof as illustrated in the accompanying drawings, in which:

FIG. 3 illustrates the use of additional information stored in a branch prediction table in accordance with one embodiment.

DESCRIPTION OF EXAMPLE EMBODIMENTS

Figure 1:
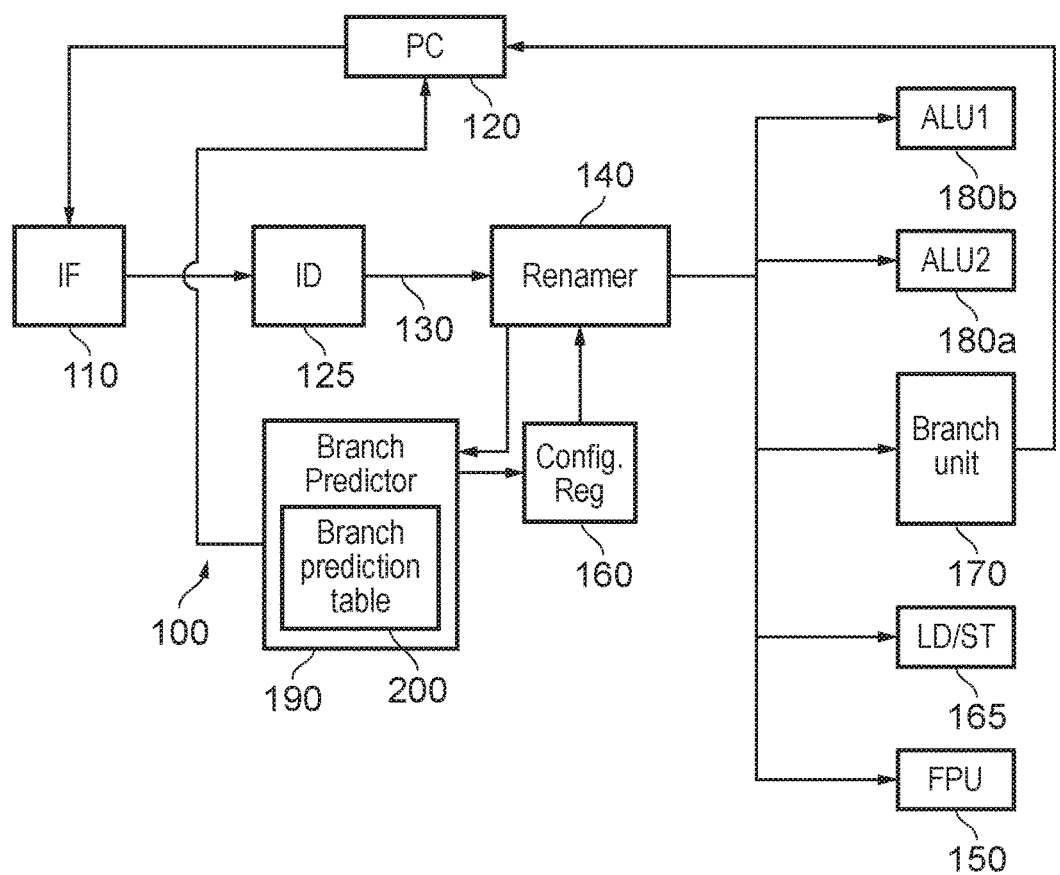
FIG. 1 schematically illustrates a data processing apparatus for executing a stream of instructions in accordance with one embodiment.

Before discussing the embodiments with reference to the accompanying figures, the following description of embodiments is provided.

In accordance with one example configuration there is provided a data processing apparatus to execute a stream of instructions, the data processing apparatus comprising: memory access circuitry to access a memory in response to control signals associated with a memory access instruction that is executed in said stream of instructions; branch prediction circuitry to predict the outcome of a branch instructions in said stream of instructions based on a branch prediction table; and processing circuitry to perform a determination of whether out-of-order execution of memory access instructions is to be performed based on memory prediction data, and to selectively enable out-of-order execution of said memory access instructions in dependence on said determination, wherein said memory prediction data is stored in said branch prediction table. The stream of instructions to be executed by the data processing apparatus often contains a number of branch instructions in order to control the flow of execution. A branch instruction causes the flow of control to jump from one instruction in the stream to another instruction in the stream. The branch instructions can be conditional in that the branch only occurs if a particular outcome is met. In these cases, the processing circuitry can predict whether the branch will or will not occur and thereby start to pre-load (e.g. fetch and decode) the next set of instructions that are due to be executed. This prediction can be made by a branch predictor, which often uses historical information stored in a branch prediction table to predict whether a particular branch will be taken or not. In the example embodiment being described, the same branch prediction table is used to store memory prediction data. The memory prediction data can then be used to determine whether out-of-order execution of instructions should be enabled or disabled at any particular point. By disabling out-of-order execution of instructions where memory ordering violations are known to occur, and by enabling out-of-order execution otherwise, it is possible to minimise disruption from memory ordering violations while enabling the process to perform out-of-order execution where possible.

In some embodiments, each entry of said branch prediction table comprises a reference to an instruction in said stream and an indication of whether out-of-order execution of said memory access instructions is to be performed; and said determination is performed in response to execution of said instruction. Entries in the branch prediction table can therefore be used to indicate, in respect of a particular instruction (which may or may not itself be a memory access instruction), whether or not out-of-order execution of memory access instructions is to occur once that instruction has been executed.

In some embodiments, said instruction is of one or more types. Accordingly, entries in the branch prediction type are associated with instructions having one or more types. For example, in some embodiments, the one more types includes a branch instruction. In other embodiments, the one or more types is a branch instruction. A program that comprises a stream of instructions can be thought of as being made up from a number of basic blocks, each basic block being defined by a particular branch instruction. On average, a basic block may be said to comprise approximately 5 instructions, although of course, this could vary greatly. It has been discovered that by disabling or enabling out-of-order execution on a basic block basis, it is possible to still maintain the efficiency improvements granted by out-of-order execution while reducing the number of times that large portions of code are executed without out-of-order execution being performed, in order to avoid memory ordering violations from occurring. In addition, it may be desirable to not have instruction-level granularity with respect to the enabling or disabling of out-of-order instruction execution, since this would involve checking (at the execution of each individual instruction) whether or not out-of-order execution should be enabled or disabled, which would likely slow down execution of the data processing apparatus. Furthermore, this level of granularity is likely to result in a large lookup table, which would additionally necessitate an increased circuitry, which would also lead to increased power consumption. It has also been discovered that by considering this issue on a basic block basis, it is possible to provide a good compromise between the need to check frequently enough to disable out-of-order execution of memory access instructions where necessary without spending a large portion of time continually checking each instruction in a lookup table, and without the need for excessive circuitry or power consumption. Since basic blocks are defined by branch instruction targets, by associating the enabling or disabling of out-of-order execution of memory access instructions with branch instructions, it is therefore possible to reach a good compromise. Where the one or more types includes or is a branch instruction, the determination regarding whether or not out-of-order execution of instructions is to take place can be associated with the associated branch being taken or the associated branch not being taken. In some embodiments, different values can be associated with each different outcome of the branch instruction.

In some embodiments, said reference to said instruction is based on a hash function; and said hash function takes at least a part of a program counter value of said instruction as an input. By using a hash function, in which the input domain is larger than the output domain, it is possible to use a branch prediction table whose size is smaller than the total number of instructions in the stream.

In some embodiments, said hash function takes at least a part of a value of a history of a state of said data processing apparatus as a further input. Accordingly, it is possible to base decisions regarding whether to enable or disable out-of-order execution of memory access instructions on not just the instruction being executed, but also the current state of the data processing apparatus. In this way, it is possible to make predictions on not only the instruction being executed, but also factors such as the sequence of instructions (or function calls) that had to be followed in order to reach the instruction being executed in order to determine whether memory access instructions should be executed out-of-order or in-order. Since the path taken to reach a particular instruction could have an effect on how the surrounding instructions are executed, such information could also have an effect on the possibility of memory ordering violations occurring and can therefore be taken into account when determining whether to enable or disable out-of-order execution of memory access instructions.

There are a number of ways in which the branch prediction table can indicate whether out-of-order execution of memory access instructions should take place. However, in some embodiments, said indication comprises a bit that represents whether out-of-order execution of memory access instructions is to be performed after execution of said instruction. Hence, after an instruction has been executed, the branch prediction table is consulted for an entry corresponding to that instruction. If such an entry exists, a bit in the table indicates whether out-of-order execution of memory instruction should, from that point forward, be enabled or disabled. The execution of other instructions may reverse that decision.

In other embodiments, said indication forms part of said reference to said instruction; said processing circuitry determines whether out-of-order execution of memory access instructions is to be performed based on whether said branch prediction table comprises an entry comprising said reference to said instruction, and whether said branch prediction table comprises an entry comprising said reference to said instruction modified by a modification function. In these embodiments, for a given instruction, two lookups are performed on the branch prediction table. The first lookup involves looking up an entry that corresponds with the instruction itself. The second lookup involves looking up an entry that corresponds with the instruction itself, as modified by a modification function. Of these lookups, the first entry (if any) could correspond with data relating to branch prediction whilst the presence of the second entry could indicate that out-of-order execution is to be suppressed. Of course, the lookups and their meanings could be reversed so that the second lookup relates to the out-of-order execution and the first lookup relates to branch prediction. Similarly, the out-of-order execution entry could relate to whether out-of-order execution is to be performed rather than being suppressed. In still other embodiments, the two lookups could be performed with reference to the instruction as modified by a first modification function and a second modification function respectively. Such embodiments have the advantage that the width of the table can be reduced by at least one bit, since there is no need for any entry to contain a bit to indicate whether or not out-of-order execution of memory access instructions is to take place or not. This reduction of width comes at the cost of requiring additional entries to indicate that out-of-order execution of memory access instructions should not occur. However, since such a situation is anticipated to occur rarely, the reduction of width can occur at low cost. There are a number of possibilities for the modification function. In some embodiments, said modification function is the logical bit-wise inverse of each bit making up said reference to said instruction. For example, for an instruction with program counter "12" (1100 in binary), a first lookup could be performed in relation to an entry 1100 and a second lookup could be performed in relation to an entry 0011 (the bit-wise inverse, achieved by flipping each of the bits).

In some embodiments, each entry of said branch prediction table additionally comprises a condition associated with said instruction; and in response to execution of said instruction, said processing circuitry determines that out-of-order execution of memory access instructions is to be performed if said condition associated with said instruction is met and determines that out-of-order execution of memory access instruction is to be inhibited otherwise. Accordingly, in such embodiments, it is possible to achieve a greater control over whether out-of-order execution is to be performed or not. This can be particularly useful where there are many instructions between entries in the branch prediction table, since it becomes possible to avoid disabling out-of-order execution for large numbers of instructions.

In some embodiments, said condition compares a number of executed memory access instructions since said instruction was executed to a predetermined value. For example, out-of-order execution of memory access instructions could be made to occur once a number of memory access instructions equal to the predetermined value have been executed. In other words, out-of-order execution of memory access instructions is disabled and enabled once a number of memory access instructions have been executed. In such embodiments, therefore, it is not necessary to disable out-of-order execution of memory access instructions for the entirety of set or group of instructions, but instead only for the first part of group. Later memory access instructions, which are known to not cause memory ordering violations when executed out-of-order, can thereby still be executed out-of-order.

In some embodiments, said condition is that one or more memory access instructions referenced by said condition have been executed. In such embodiments, each entry in the branch prediction table includes extra information that references one or more memory access instructions. Once the one or more memory access instructions have been executed, out-of-order execution of further memory access instructions proceeds. Such a mechanism can be used to list memory access instructions that are known to cause memory ordering violations if executed in a different order. Consequently, once those particular memory access instructions have been executed, it is possible to begin executing other memory access instructions out of order where appropriate.

In some embodiments, the data processing apparatus further comprises storage circuitry to store a reference to a previous instruction, wherein in response to a memory ordering violation, said processing circuitry causes said branch prediction table to store an entry comprising said reference to said previous instruction and an indication that out-of-order execution of memory access instructions is to be inhibited. In this way, it is possible for the data processing apparatus to learn and adapt to the occurrence of memory ordering violations so that, the next time the instruction is encountered, out-of-order execution can be disabled so that memory ordering violations are inhibited from occurring.

In some embodiments, the data processing apparatus further comprises storage circuitry to store a reference to a previous instruction, wherein in response to an absence of memory ordering violation from execution of memory access instructions between said previous instruction and an instruction following said previous instruction, said processing circuitry causes said branch prediction table to store an entry comprising said reference to said previous instruction and an indication that out-of-order execution of memory access instructions is to be enabled. In this way, it is possible for the data processing apparatus to learn and adapt to the lack of memory ordering violations so that, the next time the instruction is encountered, out-of-order execution can be enabled so that execution efficiency of instructions can be improved.

Particular embodiments will now be described with reference to the figures.

FIG. 1 schematically illustrates a data processing apparatus 100 for executing a stream of instructions in accordance with one embodiment. The data processing apparatus comprises an instruction fetcher 110, which fetches one instruction at a time from a memory. The instruction that is fetched from memory is referred to a value of a program counter (PC) 120. Accordingly, by controlling a value of the program counter 120, it is possible to control the next instruction that is fetched by the instruction fetcher 110. The fetched instruction is passed by the instruction fetcher 110 to an instruction decoder 125. The instruction decoder 125 analyses the fetched instruction and causes one or more control signals 130 to be generated. The control signals pass through a renamer 140. The renamer 140 performs renaming on memory locations and storage locations (such as registers) referred to in instructions so that the instructions can be executed in a different order.

This allows out-of-order execution of instructions to take place, which makes it possible to improve utilisation or efficiency of the data processing apparatus 100. For example, if the single Floating Point Unit (FPU) 150 will be in use for a number of clock cycles then it may not be possible to execute another instruction that utilises the FPU 150 until the previous instruction has finished. The execution of instructions in the data processing apparatus 100 therefore stalls. One way to resolve this, would be for other instructions that do not make use of the FPU to execute ahead of the second FPU instruction. In this way, utilisation of the data processing apparatus 100 can be improved. Whether or not out-of-order execution of instructions is permitted (or the degree to which they are permitted) can be controlled by a value stored in a configuration register 160.

Having performed renaming where appropriate and when permitted by the configuration register 160, the resulting modified control signals are then sent to one or more execution units 150, 170, 180a, 180b in dependence on each control signal. In the example embodiment shown in FIG. 1, these execution units include the previously mentioned FPU 150, a load/store unit 165 for accessing a memory, a branch unit for controlling the execution flow via program register 120, and two Arithmetic Logic Units (ALUs) for performing integer arithmetic and logic operations.

During execution of the stream of instructions, the execution flow of the program might be altered by the branch unit 170. In particular, on encountering a branch instruction that controls the flow of control, such as a branch, conditional branch, or jump instruction, the branch unit updates the value of the program counter 120 so that a next fetched instruction by the instruction fetcher will be somewhere else in the stream of instructions (other than a next instruction). A conditional branch instruction causes the execution flow to change in dependence on whether a condition is met.

However, it can take a number of processing cycles for it to be determined whether or not the condition is met. During this time, it is not known which instruction will be executed next, therefore a prediction is made using a branch predictor 190. The branch predictor can arrive at its conclusion in a number of ways. However, in the present embodiment, the branch predictor uses historical data in the form of branch prediction tables 200 (shown in more detail with respect to FIGS. 2A and 2B) in order to arrive at a conclusion regarding whether the branch will be taken or not. Once the prediction is known, the next instruction to be executed can be fetched and decoded and can even begin execution before the outcome of the condition is known. If the prediction was correct, the data processing apparatus 100 can continue to execute instructions as normal. Otherwise, the data processing apparatus 100 must "roll back" or "rewind" and begin execution of the block of instructions that were not predicted.

In the present embodiment, as well as containing data regarding branch predictions, the branch prediction tables 200 also contain memory prediction data, which is used to determine whether out-of-order execution of memory access instructions (and potentially other instructions as well) is permitted in response to performing a branch prediction.

Figure 2A:
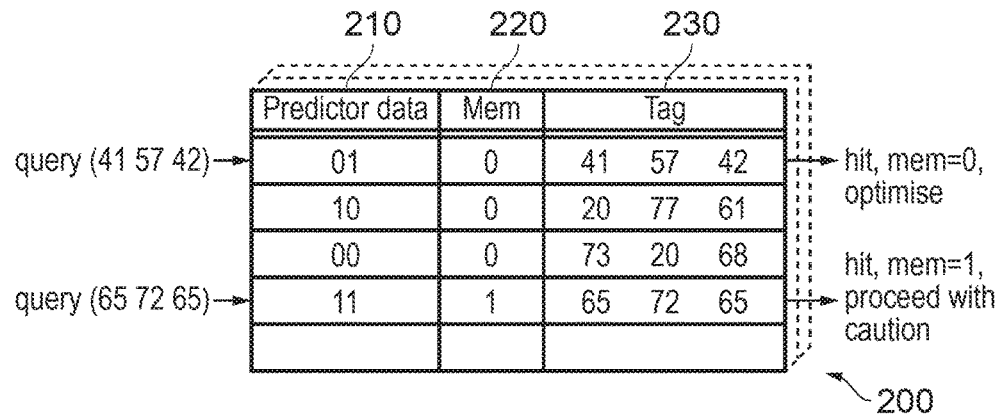
FIG. 2A illustrates a format of a branch prediction table in accordance with one embodiment.

FIG. 2A illustrates a format of branch prediction tables 200 in accordance with one embodiment. Each table includes three columns. A first column 210, the predictor data, is a 2-bit saturated counter that is used for branch prediction and represents whether an branch instruction is strongly taken (00), taken (01), not-taken (10), or strongly not taken (11). In respect of the associated branch instruction, each time the branch is taken, the counter decreases (to a minimum of 00=0) and each time the branch is not taken the counter increases (to a maximum of 11=3). When the counter has the value of strongly taken or taken, it is predicted that the next time the instruction is encountered, the branch will be taken. Similarly, when the counter has the value of not-taken or strongly not-taken, it is predicted that the next time the instruction is encountered, the branch will not be taken.

The second column 220, memory prediction data, indicates whether or not out-of-order execution of instructions is permitted if the branch is taken. A value of '0' represents yes and a value of '1' represents no. Clearly in other embodiments, these values could be reversed. Similarly, in other embodiments, the values could refer to whether out-of-order execution of instructions is permitted if the branch is not taken. Other still embodiments could contain different columns for whether the branch is or is not taken. In this embodiment, all out-of-order execution is enabled or disabled. However, in other embodiments, it may be possible to have a finer-degree of control over the extent to which out-of-order execution occurs. In these embodiments, a value of '0' represents the situation in which no memory ordering violation is anticipated, and optimisation of the ordering can proceed whereas a value of '1' represents the situation in which some violation could be anticipated and any reordering should proceed with caution.

Finally, in a third column 230, a tag for the associated instruction is provided. In this embodiment, the tag is a hash of both a part of the program counter value at which the branch instruction occurs and also a part of a global history register, which provides the last 'n' decisions as to whether or not a branch was taken. By considering both of these factors, it is possible to consider not only an instruction, but also the history of execution leading to that instruction so that if the same instruction is approached from different contexts (which might well lead to different conclusions regarding whether to branch or not), it will have different entries, and thereby potentially produce more accurate predictions for branch prediction. Note that in this embodiment, a number of branch prediction tables are provided. Each branch prediction table varies the number of bits taken from each of the program counter value and global history register. Accordingly, it is possible to have a number of tables, each having different levels of granularity and this can provide different qualities of branch prediction with more accurate predictions having a higher lookup cost. In other embodiments, only a single table is provided and the number of bits from each of the program counter value and the global history register is fixed.

Figure 2B:
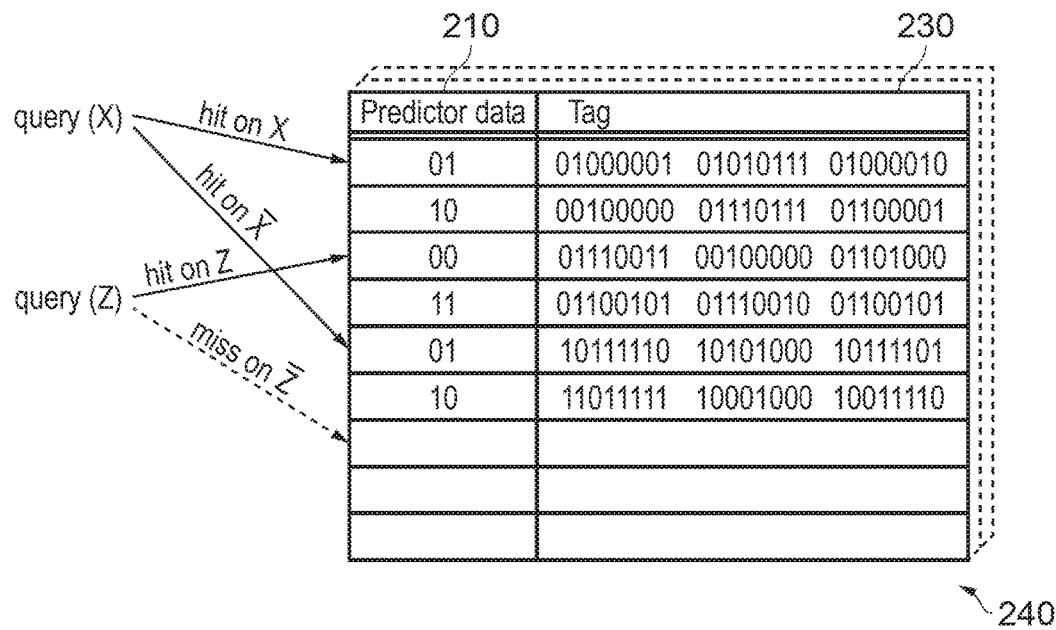
FIG. 2B illustrates a format of a branch prediction table in accordance with another embodiment.

FIG. 2B illustrates a format of a branch prediction table 240 in accordance with another embodiment. In the table 240, the predictor data column 210 and the tag column 230 remain, but the memory prediction column 220 has been removed. In this embodiment, in order to query whether or not a particular entry in the table exists, it is necessary to perform two lookups. The first lookup corresponds with branch prediction data, whilst the second lookup corresponds with whether or not out-of-order execution should be enabled or not. For example, for a given value X that is made up from part of a program counter value and part of a global history register value, a lookup is performed on X as well as $\overline{X}$ (the inverse of X) by performing a modification function. For example, an inverse of the value 01000001 01010111 01000010 is 10111110 10101000 10111101, which is achieved by inverting each of the bits. A hit on X provides data relating to the branch prediction. Meanwhile, a hit or miss on $\overline{X}$ indicates whether or not out-of-order execution of memory access instructions is to occur. In the embodiment of FIG. 2B, a hit on $\overline{X}$ occurs, meaning that when the branch is taken, out-of-order execution is prohibited. Meanwhile, a miss on $\overline{Z}$ occurs, meaning that when the branch is taken, out-of-order execution is not permitted. Since it is anticipated that out-of-order execution will usually be permitted, it is not necessary to add many entries to the table in order to represent this form of encoding. However, it makes it possible to remove a column from the table as compared to FIG. 2A. Of course, it will be appreciated that other encodings or representations are also possible, as discussed with respect to FIG. 2A. Similarly, other modification functions are also possible. For example, the modification function could be achieved by adding the value '1' to the initial value. Similarly, in some embodiments, given a value X, two lookups could be performed corresponding to mod_function1(X) and mod_function2(X).

FIG. 3 illustrates the use of additional information 260 stored in a branch prediction table 250 in accordance with one embodiment. In this embodiment, the table can be similar to either of the branch prediction tables 200, 240 already discussed with reference to FIGS. 2A and 2B except that this table 250 comprises a column 260 containing extra information. In some embodiments, this extra information 260 could even be encoded in a predictor data field. The extra information 260 can be used to provide a finer-grained degree of control over whether or not out-of-order execution of memory access instructions is permitted or not. For example, the extra information could correspond with a condition that must additionally be met (or not met) in order for out-of-order execution of memory access instructions to be enabled (or disabled). For example, in the embodiment of FIG. 3, the extra information column 260 comprises a number of memory access instructions. If the branch instruction associated with the tag (01000001 10101000 10111101)

is taken, then out-of-order memory execution is prohibited until 2 memory access instructions have been executed (in order). At that point, out-of-order execution of memory access instructions is permitted. This can be used in the situation whereby, in a large basic block, the one or both of the first two memory access instructions cause a memory ordering violation to occur, but any instructions thereafter are okay to be executed out-of-order. Of course, other embodiments could behave differently. For example, the condition could correspond with the number of memory access instructions that can be executed out-of-order until out-of-order execution is prohibited. In still other embodiments, the extra information is able to directly reference one or more of the memory access instructions that are known to cause memory ordering violations or could reference one or more memory access instructions that are not known to cause memory ordering violations. For example, the value '2' could indicate that either the second memory access instruction after the branch instruction causes a memory ordering violation or that the second memory access instruction after the branch instruction does not cause a memory ordering violation. A bitfield could be used to provide a set of memory access instructions that are either allowed to be performed out-of-order or are not allowed to be performed out-of-order. Other alternatives will be apparent to the skilled person.

In each of the branch prediction tables that have been shown, each entry has corresponded with a particular branch instruction. Of course, it will be appreciated that entries corresponding with other types of instructions can also be included. For example, entries could be stored in relation to the memory access instructions themselves so that whenever a memory access instruction occurs, the branch prediction table is consulted to determine whether the memory access instruction should be permitted to occur out-of-order or not.

Figure 4:
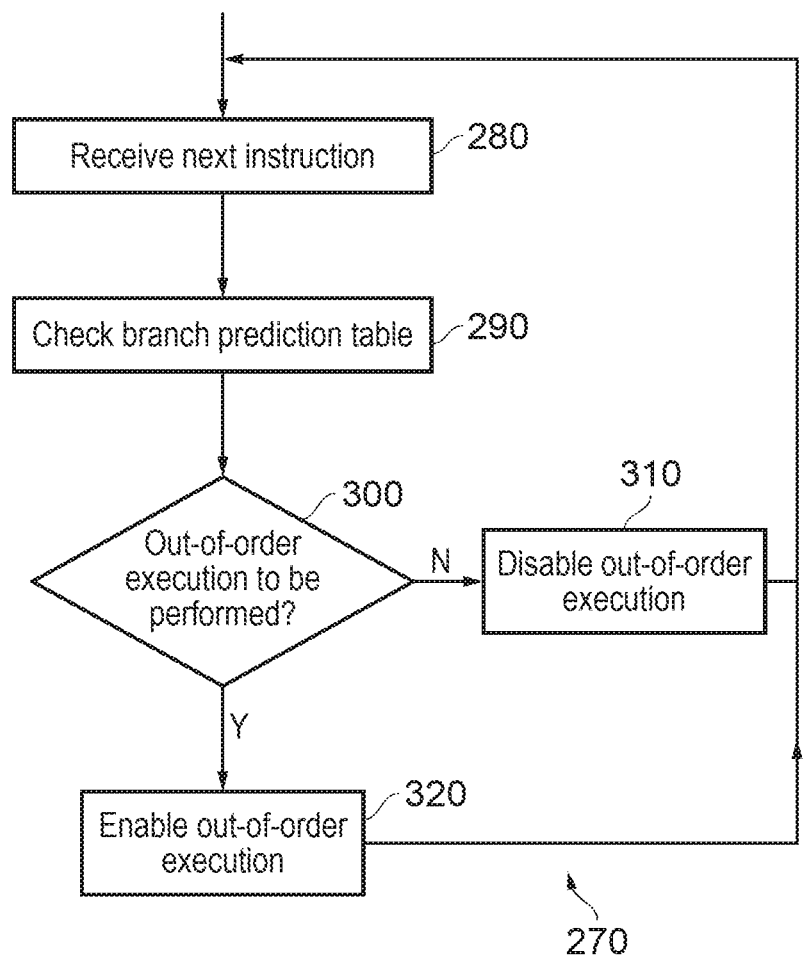
FIG. 4 shows a flowchart that illustrates a method of executing instructions in a stream of instructions in accordance with one embodiment.

FIG. 4 shows a flowchart 270 that illustrates a method of executing instructions in a stream of instructions in accordance with one embodiment. The process starts at a step 280 in which a next instruction is fetched. At a step 290, a branch prediction table is checked, if appropriate, for an entry that corresponds with the fetched instruction. Note that it is only necessary to consult the branch prediction table for appropriate types of instruction. For example, in embodiments where the memory prediction data is associated with branch instructions (and thereby associated with basic blocks) there is no need to consult the branch prediction table in respect of any other kind of instruction other than a branch instruction. If the branch prediction table is checked then at step 300 it is determined whether or not out-of-order execution of instructions is to be performed after the fetched instruction has been executed. If not, then at step 310, out-of-order execution is disabled (if it is not already), and the process returns to step 280 where the next instruction is fetched. Otherwise, out-of-order execution is enabled (if it is not already) at step 320 and the next instruction is fetched at step 280.

Accordingly, it is possible to perform memory prediction, regarding whether out-of-order execution of memory access instructions is permitted or not by making use of a branch prediction table, which may already exist. This can be achieved with very little increase in the size of the branch prediction table—potentially requiring only a new one-bit column. It may therefore be possible, in some embodiments, to avoid the need for additional complex circuitry, which may increase the size and/or power consumption of the processor. Furthermore, although decisions regarding whether out-of-order execution of memory access instructions might only be made on a basic block level of granularity if the branch prediction table continues to only store references to branch instructions, it is possible to provide additional information so as to improve the level of granularity—for example, by specifying the conditions under which out-of-order execution is to be enabled/disabled within a specific basic block.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus to execute a stream of instructions, the data processing apparatus comprising:
    memory access circuitry to access a memory in response to control signals associated with a memory access instruction that is executed in said stream of instructions;
    branch prediction circuitry to predict the outcome of branch instructions in said stream of instructions based on a branch prediction table; and
    processing circuitry to perform a determination of whether out-of-order execution of memory access instructions is to be performed based on memory prediction data, and to selectively enable out-of-order execution of said memory access instructions in dependence on said determination, wherein
    said memory prediction data is stored in said branch prediction table;
    each entry of said branch prediction table comprises a reference to an instruction in said stream and an indication of whether out-of-order execution of said memory access instructions is to be performed;
    said determination is performed in response to execution of said instruction;
    each entry of said branch prediction table additionally comprises a condition associated with said instruction;
    in response to execution of said instruction, said processing circuitry determines that out-of-order execution of memory access instructions is to be performed if said condition associated with said instruction is met and determines that out-of-order execution of memory access instruction is to be inhibited otherwise; and
    said condition compares a number of executed memory access instructions since said instruction was executed to a predetermined value.

2. The data processing apparatus according to claim 1, wherein
    said instruction is of one or more types.

3. The data processing apparatus according to claim 2, wherein
said one or more types includes a branch instruction.

4. The data processing apparatus according to claim 2, wherein
said one or more types is a branch instruction.

5. The data processing apparatus according to claim 1, wherein
said reference to said instruction is based on a hash function; and
said hash function takes at least a part of a program counter value of said instruction as an input.

6. The data processing apparatus according to claim 5, wherein
said hash function takes at least a part of a value of a history of a state of said data processing apparatus as a further input.

7. The data processing apparatus according to claim 1, wherein
said indication comprises a bit that represents whether out-of-order execution of memory access instructions is to be performed after execution of said instruction.

8. The data processing apparatus according to claim 1, wherein
said indication forms part of said reference to said instruction;
said processing circuitry determines whether out-of-order execution of memory access instructions is to be performed based on whether said branch prediction table comprises an entry comprising said reference to said instruction, and whether said branch prediction table comprises an entry comprising said reference to said instruction modified by a modification function.

9. The data processing apparatus according to claim 8, wherein
said modification function is the logical bit-wise inverse of each bit making up said reference to said instruction.

10. The data processing apparatus according to claim 1, wherein
said condition is that one or more memory access instructions referenced by said condition have been executed.

11. The data processing apparatus according to claim 1, further comprising:
storage circuitry to store a reference to a previous instruction, wherein
in response to a memory ordering violation, said processing circuitry causes said branch prediction table to store an entry comprising said reference to said previous instruction and an indication that out-of-order execution of memory access instructions is to be inhibited.

12. The data processing apparatus according to claim 1, further comprising:
storage circuitry to store a reference to a previous instruction, wherein
in response to an absence of memory ordering violation from execution of memory access instructions between said previous instruction and an instruction following said previous instruction, said processing circuitry causes said branch prediction table to store an entry comprising said reference to said previous instruction and an indication that out-of-order execution of memory access instructions is to be enabled.

13. A data processing method to execute a stream of instructions in a data processing apparatus comprising a branch predictor to predict the outcome of branch instructions in said stream of instructions based on a branch prediction table, the data method comprising:
performing a determination of whether out-of-order execution of memory access instructions is to be performed based on memory prediction data; and
selectively enabling out-of-order execution of memory access instructions in dependence on said determination, wherein
said memory prediction data is stored in said branch prediction table;
each entry of said branch prediction table comprises a reference to an instruction in said stream and an indication of whether out-of-order execution of said memory access instructions is to be performed;
said determination is performed in response to execution of said instruction;
each entry of said branch prediction table additionally comprises a condition associated with said instruction;
in response to execution of said instruction, it is determined that out-of-order execution of memory access instructions is to be performed if said condition associated with said instruction is met and otherwise it is determined that out-of-order execution of memory access instruction is to be inhibited; and
said condition compares a number of executed memory access instructions since said instruction was executed to a predetermined value.

14. A data processing method to execute a stream of instructions in a data processing apparatus comprising a branch predictor to predict the outcome of branch instructions in said stream of instructions based on a branch prediction table, the data method comprising:
means for performing a determination of whether out-of-order execution of memory access instructions is to be performed based on memory prediction data; and
means for selectively enabling out-of-order execution of said memory access instructions in dependence on said determination, wherein
said memory prediction data is stored in said branch prediction table;
each entry of said branch prediction table comprises a reference to an instruction in said stream and an indication of whether out-of-order execution of said memory access instructions is to be performed;
said determination is performed in response to execution of said instruction;
each entry of said branch prediction table additionally comprises a condition associated with said instruction;
in response to execution of said instruction, it is determined that out-of-order execution of memory access instructions is to be performed if said condition associated with said instruction is met and otherwise it is determined that out-of-order execution of memory access instruction is to be inhibited; and
said condition compares a number of executed memory access instructions since said instruction was executed to a predetermined value.

* * * * *